United States Patent Office 3,402,054
Patented Sept. 17, 1968

3,402,054
FRICTION MATERIAL
Frank Wood, New Mills, near Stockport, and Eric Clark,
Newton, New Mills, near Stockport, England, assignors
to Ferodo Limited, Manchester, England, a British
company
No Drawing. Filed Nov. 29, 1965, Ser. No. 510,373
Claims priority, application Great Britain, Nov. 30, 1964,
48,670/64
9 Claims. (Cl. 106—36)

ABSTRACT OF THE DISCLOSURE

A friction material comprising an inorganic fiber, such as asbestos, and a binder in which the binder is wholly or substantially wholly composed of copper sulphide formed in situ. The copper sulphide may be formed from copper power and sulphur. Additional materials such as metallic powders, mineral fillers, antioxidants and friction modifiers may be included in the friction material. The material may be formed by a method which comprises compacting and curing a mixture of ingredients which contains copper powder and sulphur. Curing may be carried out under a pressure of from 2 to 20 tons per square inch in the temperature range of 80 to 220° C.

---

Friction materials used as brake linings, disc brake pads, clutch facings or railway brake blocks are commonly made under suitable conditions of temperature and pressure from asbestos or other inorganic fibres and other ingredients which may include rubber, metallic powders, mineral fillers, cured rubber powders, graphite, rubber-curing ingredients, antioxidants and lubricants. A binder is always present, and a resin is commonly added to the mix to act as a binder. Rubber itself will act as a binder, and rubber and resin may be present together; vegetable oils can also be used as binders, again with or without rubber.

Friction materials containing conventional organic binding agents exhibit poor frictional stability under varying temperature conditions. Considerably higher temperatures are generated in disc brakes than in drum brakes, with the result that organically-bound friction materials are more likely to disintegrate; the thermal degradation of such binders results in inferior frictional characteristics, giving rise to fade and often resulting in increased wear. Furthermore, organic materials, particularly resins, tend to have short shelf life, and are not always easy to reproduce.

In an attempt to overcome the deleterious effects of poor thermal resistance in a friction material having an organic binder, various sintered metal and ceramic materials in which the sintering effects the bonding have been developed. However, sintering is normally a high-temperature process, for example, the sintering of copper-based friction materials is generally carried out at a temperature of 500° C. or above, and in other processes temperature in excess of 750° C. may be used, necessitating the use of controlled or conditioned atmospheres and other complicated manufacturing techniques.

According to the invention, the binder is wholly or substantially wholly composed of copper sulphide formed in situ by reaction of sulphur with copper powder or cuprous sulphide. The copper sulphide may be cupric or cuprous sulphide or a mixture of the two.

Sulphur will react with copper to yield cupric sulphide according to the equation.

$$Cu + S \rightarrow CuS$$

It will also react with cuprous sulphide according to the equation $$Cu_2S + S \rightarrow 2CuS$$

This reaction is reversible, and at a temperature of 220° C. the cupric sulphide dissociates to cuprous sulphide and sulphur.

To act as a binder it is essential that the copper sulphide be formed within the mass it is to bind, but if a cupric sulphide binder dissociates after being formed the resultant cuprous sulphide still acts as a binder.

We prefer to use copper powder and sulphur as the starting materials, and to make the proportions and reaction (or curing) conditions such that cupric sulphide is predominantly formed. The ratio of copper powder to sulphur may be varied over wide ranges. So long as sufficient copper sulphide is formed to bind the friction material, a slight excess of one or other ingredient does not effect the finished product. It is preferred to work with a ratio of copper powder to sulphur in the mixture lying between 1:1 and 3:1 by weight, and in general a slight excess of sulphur over that required to produce cupric sulphide with the copper powder is desirable. If the ratio is increased to 4:1 the copper sulphide formed will be predominantly or nearly wholly cuprous sulphide.

A friction material formed from asbestos or other inorganic fibre with fillers and friction modifiers will normally require a content of at least 10% by volume of binder calculated as cupric sulphide. This figure is dependent to a certain extent on the content of inorganic fibre or of other constituents, but will usually give a satisfactory material. The proportion of copper sulphide may, of course, be increased, but any copper sulphide in excess of about 50% by volume is no longer acting as a binder but as a filler. Any copper powder or sulphur which is not combined as copper sulphide will also be present in the friction material as a filler. The presence of uncombined copper or sulphur in the friction material may even be advantageous.

The main advantage obtained by means of the invention is improved rate of wear compared with a conventional resin-bound material of similar or lower coefficient of friction when tested under the same conditions. This improvement becomes increasingly more marked as the operating temperatures are increased.

In comparison with sintered materials the advantage is obtained that the curing temperature required to produce the bond is low.

The conditions of temperature and pressure may vary fairly substantially. Obviously there is a minimum temperature at which the reaction between copper and sulphur will be initiated under a given pressure used for curing, and it is desirable for economic reasons and ease of handling that the curing temperature should be at or near to this minimum value.

In general the curing time is from ½ minute upwards, the pressure from 2 to 20 tons/in.² and the temperature from 80° C. to 220° C., but provided copper sulphide is formed by reaction these conditions are not critical. The time, temperature and pressure of curing are interdependent to give the best results, and are also to some extent dependent on the relative quantities of sulphur and copper powder or cuprous sulphide in the mixture of ingredients.

In general friction materials according to the invention will contain from 15 to 50% by volume of asbestos or other inorganic fibre, and the fibres most commonly used are those of Grades 5 and 7. The asbestos or other fibre and copper sulphide binder together will normally constitute at least 25% by volume of the friction material, the content by volume of fillers, lubricants or other additives thus being from 0 to 75%.

Two examples of mixtures from which friction materials may be made according to the invention (in parts by weight) are:

Example I:
| | |
|---|---|
| Copper powder (300 mesh) | 29.2 |
| Sulphur | 16.9 |
| Graphite | 18.6 |
| Asbestos fibre | 21.3 |
| Silica | 10.0 |
| Alumina | 4.0 |

Example II:
| | |
|---|---|
| Cuprous sulphide | 140 |
| Sulphur | 30 |
| Asbestos fibre | 52 |
| Silica | 25 |
| Barytes | 90 |
| Graphite | 23 |

Each of these mixtures may be cold-compacted, cured for ½ minute at 105° C. under a pressure of 6 tons/in.$_2$, and finally baked for 2 hours at 190° C.

In forming the mixture, all the constituents except the copper or cuprous sulphide may be mixed for 10 minutes and then disintegrated through a ⅛ inch mesh screen. The mixture may then be spread out in shallow trays to cool, and allowed to stand for 24 hours in order to eliminate the fire risk which would arise if finely divided materials, warmed by the mixing step, were stored in containers. The copper powder or cuprous sulphide may then be added and the materials mixed for a further 10 minutes. If the copper powder or cuprous sulphide were mixed in initially, there would be a danger of sufficient heat being generated in the disintegration step to initiate the exothermic reaction between the sulphur and copper or cuprous sulphide.

After the initial mixing step, the product may be left for as long as required. However, once the copper powder or cuprous sulphide is added, it is desirable that the mixture be cured as soon as possible because its flow characteristics tend to deteriorate.

The friction characteristics of the material of Example I were tested in a disc brake system on an inertia dynamometer using an automobile disc brake caliper and a cast iron braking disc 9¾ inches in diameter and ½ inch thick. Two friction buttons formed from the material were placed in the caliper opposite each other on opposite sides of the braking disc. The tests were designed to simulate normal usage of automobile brakes, two sets of conditions being used as follows:

Test A: 300 applications of the brake were made, $2.46 \times 10^4$ ft. lb. of kinetic energy being dissipated at each application, with 60 seconds intervals between applications. Braking torques of 180 and 360 lb. ft. respectively were used for alternate groups of 25 applications, the stopping times at these torques being 2.8 and 1.4 sec. respectively. The brake disc temperature was 120° C. at the beginning of each of the applications.

Test B: 200 applications of the brake were made, $4.23 \times 10^4$ ft. lb. of kinetic energy being dissipated at each application, with 40 seconds intervals between applications. Braking torques of 180 and 360 lb. ft. respectively were used for alternate groups of 25 applications, the stopping times at these torques being 2.0 and 4.0 sec. respectively. The brake disc temperature was 210° C. at the beginning of each of the applications.

The complete test schedule consisted of Test A repeated three times followed by Test B repeated twice. Measurements of thickness were made after each Test A and after each Test B.

The coefficient of friction of the material was 0.40 during each Test A and the mean wear of the buttons after each Test A was 3.3, 6.0 and $2.7 \times 10^{-3}$ inch respectively. During each Test B the coefficient of friction was 0.40 and the mean wear after each test B was 5.2 and $3.0 \times 10^{-3}$ inch respectively.

Similar buttons manufactured from a friction material with a conventional resin binder which has been sold widely for automotive disc brakes were tested to the same schedule. During Tests A the coefficient of friction was 0.32 and the mean wear after each test was 6.6, 5.7 and $4.2 \times 10^{-3}$ inch respectively. In Tests B the coefficient of friction was 0.38 and the wear after each test was 20.0 and $17.8 \times 10^{-3}$ inch respectively.

We claim:

1. A friction material comprising from 15–50% by volumn of an inorganic fiber and from 10–50% by volumn of a binder in which the binder is substantially wholly composed of copper sulphide formed in situ.

2. A friction material according to claim 1 in which the copper sulphide is formed from copper powder and sulphur.

3. A friction material according to claim 1 in which the copper sulphide binder, calculated as cupric sulphide, forms between 10% and 50% by volumn of the friction material.

4. A friction material according to claim 1 formed from a mixture of ingredients in which the ratio of copper to sulphur is from 1:1 to 3:1 by weight.

5. A friction material according to claim 1 formed from a mixture of ingredients which also comprises a metallic powder, a mineral filler and an antioxidant or a friction modifier.

6. A method of making a friction material as claimed in claim 1 which comprises compacting and curing a mixture of ingredients as defined in claim 1 in which the mixture contains copper sulphide, said copper sulphide being formed by the in situ reaction of copper powder and sulphur, said compacting and curing being conducted under a pressure of from about 2 to 20 tons per square inch in the temperature range of from about 80 to 220° C.

7. A material as in claim 1 wherein said inorganic fiber is asbestos.

8. A material as in claim 5 wherein said mixture of ingredients includes a friction modifier.

9. A method as in claim 6 wherein said inorganic fiber is asbestos.

References Cited

UNITED STATES PATENTS 2,252,991   8/1941   Steck _____ 106—36

FOREIGN PATENTS 1,150,919   1/1964   Germany.
1,164,305   2/1964   Germany.

JAMES A. SEIDLECK, *Primary Examiner.*

T. MORRIS, *Assistant Examiner.*